United States Patent Office 3,256,101
Patented June 14, 1966

3,256,101
METHOD OF MICROWAVE HEATING
Robert G. Arns, Eggertsville, N.Y.
(174 Delta Road, Buffalo 26, N.Y.)
No Drawing. Filed Apr. 22, 1963, Ser. No. 274,795
14 Claims. (Cl. 99—221)

This invention relates generally to the art of food preparation, and more particularly to the preparation of food for heating by high-frequency electromagnetic radiation or microwave energy although its utility is not necessarily limited thereto. It is believed that my invention will prove especially valuable in the reheating of previously prepared meals, or parts thereof, from a refrigerated or frozen state, as well as in the original cooking thereof.

Microwave heating offers certain advantages over other heating techniques. For example, it is faster, making it possible to heat foods very rapidly. This is particularly valuable in the commercial reheating of previously prepared foods.

However, microwave heating poses certain problems. For example, some foods absorb microwave energy more readily than others, whereby it has been impossible to simultaneously heat different parts of a meal to the same temperature. Also, the distribution of heat through a given food will vary, whereby the edges will be hot while the center remains cold.

This non-uniformity in heating is highly undesirable, and often results in a general deterioration in the appearance and flavor of certain foods.

For example, a meal consisting of roast beef, peas and mashed potatoes, as normally prepared for restaurant use would produce the following result if reheated from the frozen state in a conventional microwave oven in a given time. The peas would be hot, at, for example, 160° F. The beef would be somewhat cooler, and unevenly heated. The mashed potatoes would have an edge temperature of, for example, 120° F. with approximately one-third of the mass remaining frozen.

Such a result is totally unacceptable, and is a paramount reason why mircowave heating has not begun to achieve its potential.

Accordingly, a primary object of my invention is to regulate and control the distribution of microwave heat through a given food portion, and among different food portions, to achieve a more uniform heating effect.

That this object is met with my invention is shown by the fact that when the foregoing meal is prepared in accordance with my invention, the different food items can be brought to within a completely acceptable range of serving temperatures in the same time and at the same microwave heating rate as before. For example, when the outside edges of the mashed potato reach a temperature of 180° F., the center will be at approximately 150° F. Moreover, both flavor and appearance will be better than before.

Another problem arises from the fact that microwave heating, while relatively very fast, heretofore has not been quite fast enough for some purposes. For example, where it is desired to heat previously prepared meals from a frozen state, and vend them from machines at serving temperatures, practical requirements dictate a reheating time of about 30 seconds or less. Otherwise, the number of people which can be served by the machine in a given time is too limited. While increasingly bigger microwave ovens can be built, practical requirements restrict the size of the oven for vending machine use.

Accordingly, another object of my invention is to materially reduce the time required to heat foods, from either a frozen or a refrigerated state, to serving temperature, with a given microwave heat input rate, without adversely affecting the flavor, appearance, odor and other qualities of the food.

Briefly stating one aspect of my invention, I have determined that the heating effect of microwave energy on foods can be controlled and regulated by the distribution of ionizable salts in the foods. Varying the concentration of an ionizable salt in food will vary the microwave energy uptake, or heating of the food. Thus, I apply a relatively heavier concentration of the ionizable salt in those foods having a relatively lower rate of absorption of microwave energy, thereby increasing the relative heating effect therein. I also apply a relatively greater concentration of the ionizable salt in that portion of a given food item which ordinarily receives the least microwave energy, to increase the relative heating effect thereat.

The utilization of ionizable salts in this manner produces an increase in the concentration of ions available in the salted region or regions. By providing an ionizable medium, or increasing the ionizable medium already present, through the addition or concentrating of an ionizable salt, a higher microwave energy uptake and greater heating effect is produced.

The ionizable salt must possess certain other properties to be usable. It must be non-toxic, in the quantity used. Also, it must be free of unpleasant or undesirable effects on the taste, appearance, odor and other sensory characteristics of the food, in the quantity used. Such salts may be selected from the group consisting of strong acid-strong base, strong acid-weak base, weak acid-strong base and weak acid-weak base, although it is preferred to present a salt which is composed of both strong anions and cations to provide the highest excitation when exposed to microwave energy. Sodium chloride is preferred. Other suitable ionizable salts include mono-sodium glutamate, tri-calcium phosphate, potassium chloride and potassium glutamate. Sodium and potassium sulfate, sodium carbonate, sodium nitrate, and calcium and sodium phosphate also could be used. However, it appears that sodium chloride presently is the most desirable, from the aesthetic viewpoint.

In the case of a single food portion such as a serving of mashed potato, it is approximately the center one-third of the mass which otherwise remains unheated. This occurs because of the bulk of the energy is absorbed by the outermost portions. In accordance with my invention, I provide a higher energy uptake in this center one-third of the mass, and consequently more nearly uniform heating throughout, by adding, or concentrating an ionizable salt in that center portion. In the example given above, when prepared in accordance with my invention, one-half the amount of seasoned salt ordinarily used was mixed uniformly throughout the sample, while the other half was mixed uniformly into approximately the center one-third of the mass. This caused a much higher energy uptake in the center one-third than before, resulting in more nearly uniform heating throughout, as noted above.

The salt can be added to the food in a solution, or can be liberally sprinkled in the food in crystal form.

In addition to regulating the dissipation or microwave energy and resulting distribution of heat through a given food portion, the relative heating of different foods can be similarly regulated with my invention. Thus, in a given food package, those foods which normally are served in relatively finely divided form, such as peas and diced carrots have a relatively high rate of absorption of microwave energy and will receive relatively little, or no ionazable salt. Those foods which normally are served in bulk, such as mashed potatoes, have relatively low rates of microwave energy absorption and will receive increasingly greater concentrations of the salt. The two controls can, and usually will be combined, with the relative concentration of ionizable salt, or salts, in different foods varying generally inversely with the relative rates of microwave absorptions thereof, and with the relative distribution through a single food varying generally with the pattern of heat concentration desired.

Another aspect of my invention, which preferably should be combined with my use of salt distribution to obtain the desired temperature upon microwave application, can be stated as follows. I have determined that the amount of time required to heat a given package can be reduced, without adversely affecting the quality thereof, by extracting part of the water content of the food package and substituting in its place organic additives having a significantly lower specific heat capacity and latent heat of fusion than water.

Of all common substances, water has the highest latent heat of fusion and specific heat capacity. Therefore, it requires the largest energy input to elevate it to a given temperature. Since associated and unassociated water can comprise the largest part of a given food package, by weight, it is seen that the energy input consumed in heating the water content of food is a limiting factor of tremendous significance.

Accordingly, the controlled dehydration of food can significantly reduce reheating time. In other words, the food can be reheated in its dehydrated state. If additional moisture is needed, upon reheating, it can be added for example as steam in one part of the reheating process. Alternately, the heated food can be reconstituted from a separate supply of hot water. Preferably, however, in accordance with my invention I go beyond merely reducing the water content of the food. In addition I substitute, for all or part of the extracted water, an organic additive having a specific heat capacity and latent heat of fusion significantly smaller than that of water. These steps, of extracting water from the food and substituting such an additive for at least part of the extracted water, are taken before heating the food to the serving temperature, being done either before original cooking or before reheating.

I have determined that, when intimately mixed with the water remaining in the food, either by solution, suspension or emulsion, such additives have the effect of reducing the specific heat capacity and latent heat of fusion of the combination far below that of water alone. Indeed, there appears to be a synergistic action, in the sense that moderate additions of such substances result in an unexpected total reduction in heat input requirements.

In addition to a relatively lower latent heat of fusion and specific heat capacity, such additives must be non-toxic and aesthetically acceptable in the quantity used. Typical liquids, which can be used for this purpose include the fatty oils such as corn oil, cottonseed oil, peanut oil, safflower oil and glycerol. Some of these, at least, also are desirable additives because they tend to improve the flavor and appearance of the food. These oils may be fully or partially hydrogenated, although polyunsaturated vegetable oils have proven to be particularly appropriate from the point of view of taste, appearance and established acceptance.

The organic liquid can be added directly to the food sample. For example, in the reconstitution of dried foods, instead of merely adding water a certain amount of vegetable oil can be added, along with a correspondingly reduced amount of water. Many of these oils will form a stable emulsion with water, but, if required, emulsifying agents may be added. In view of the basic nature of the fatty oils it is desirable that the emulsifier have an HLB value less than 10, although it is possible to use emulsifiers having HLB values greater than 10 in some instances. Specific emulsifiers include the "SPAN" series manufactured by Atlas Powder Company. These emulsifiers include polyhydric alcohol esters of fatty acids such as glycerol monostearate, sorbitan monostearate and sorbitan tristearate. In this way, an emulsion can be prepared for use in cooking, and I have determined that as much as 30% by volume of these oils will form such a stable emulsion if such a volume is required.

It should be noted that the reduction in heating time brought about by this organic substitution is not confined to microwave heating. This aspect of my invention also brings about a reduction in heating time for all heating techniques.

In addition, such organic substitution has a desirable effect on the distribution of microwave heating energy. This occurs because these oils also have a lower dielectric constant than water, and therefore absorb microwave energy less readily than water. As a result, the available microwave energy can more readily penetrate to the innermost regions of a given food portion.

Thus, in addition to materially reducing the time required to heat a given food portion, the substitution of such an organic additive for part of the normal water content produces, in and of itself, a more uniform distribution of microwave heating energy in the food.

The inclusion of an ionizable salt, for control of microwave heat distribution as previously described has another desirable effect in that it also tends to reduce heating time requirements. Thus, each of the techniques described herein has its own primary effect, and also has a secondary effect contributing to the primary effect of the other.

Preferably, these techniques are used conjointly, with the control of microwave heat distribution by inclusion of an ionizable salt being aided by the substitution of an organic liquid additive for part of the extracted water, and with the reduction in heating time produced by extracting part of the water content and substituting, for part of the extracted water, an organic liquid being enhanced by the inclusion of an ionizable salt. Indeed, as indicated by the test results set forth below, it will be seen that often these techniques must be used conjointly, to produce the desired end result.

*Test results*

The following tests were made using a model 1161A Raytheon microwave oven, having a nominal rating of approximately 1.2 kva. and an operating frequency of 2450 megacycles. The oven was operated at its highest output power setting, and for the times noted.

These tests were made using mashed potatoes, because mashed potato is a very difficult food to reheat using relatively short periods of microwave heating. Single serving samples of the potatoes were prepared, as follows:

| Sample No. | Description | Additive | Composition |
|---|---|---|---|
| 1 | Control | None | 2 servings instant mashed potatoes, ¾ cup boiling water, ¼ cup cold milk, ½ pat butter. |
| 2 | Salt at center ⅓ only. | NaCl | Same as #1 except that just before freezing the center portion was scooped out and mixed uniformly with salt solution (¼ tsp./½ oz. water) then replaced and frozen. |
| 3 | Heavy uniform oil distribution. | Glycerol | Same as #1 except sub. ½ cup boiling water, ¼ cup boiling glycerol. |
| 4 | Uniform distribution of salt mixture. | NaCl+monosodium glutamate. | Same as #1 except add ¾ tsp. monosodium glutamate, ¼ tsp. NaCl. |
| 5 | Uniform salt and oil distribution. | Safflower oil NaCl. | Same as #1 except sub. ⅝ cup boiling water, ⅛ cup boiling oil, add ¼ tsp. NaCl. |
| 6 | Light uniform oil distribution with salt at center only. | Safflower oil NaCl. | Same as #1 except sub. ⅝ cup boiling water, ⅛ cup boiling oil, add ¼ tsp. NaCl to center only as per Sample #2. |
| 7 | Same as #3 | Safflower oil | Same as sample #3. |

The samples were prepared, using double servings of dehydrated, instant mashed potatoes, and then halved after preparation, to produce the test sample. The samples were frozen, over night (approximately twenty-four hours), in compressed fiber paper plates measuring approximately four inches by four inches, and one inch in depth, and were cooked in these plates. The individual samples, in their individual plates, were each subjected to forty (40) seconds of microwave heating, and the center and outside edge temperatures were measured immediately upon removal from the oven, using mercury thermometers. The following results, with the above samples, were noted.

| Sample No. | Center Temp., ° C.[9] | Outside Edge Temp., ° C. |
| --- | --- | --- |
| 1 | [1] 0 | 42 |
| 2 | [2] 0 | 57 |
| 3 | 32 | 83 |
| 4 | 6 | 66 |
| 5 | 35 | 84 |
| 6 | 52 | 80 |
| 7 | 29 | 89 |

[1] Approx. 50% ice.  [2] Approx. 10% ice.

Thus, it will be observed, that the inclusion of a relatively small amount of ionizable salt in the center one-third of the sample produced a substantial increase in the microwave heating effect at the center, as evidenced by the reduction of the amount of ice to approximately one-fifth of that in the control sample. It also will be observed that the inclusion of salt throughout increased the total heating effect, and therefore would produce a given temperature in less time, as evidenced by sample number 4.

The results obtained with sample number 3 clearly indicate an improvement in heat distribution and a significant reduction in heating time as evidenced by the temperature obtained in a given time as contrasted with control sample number 1.

Of particular interest is the result obtained with sample number 6, wherein the ionizable salt is included in a manner calculated to control the distribution of microwave heat in accordance with this invention, conjointly with substitution of an organic liquid for part of the extracted water, in accordance with this invention. The vastly superior results obtained with this sample clearly indicate the value of these techniques, used conjointly.

Accordingly, it is seen that my invention fully accomplishes its intended objects. While I have disclosed and described in detail only certain selected embodiments thereof, that has been done by way of illustration, not limitation. Such variations and modifications as will occur to those skilled in the art are intended to be included within the scope of the appended claims.

While I have spoken herein of original cooking, and reheating foods which are either frozen or refrigerated, the heating techniques of my invention are by no means limited thereto. They are equally applicable to heating of foods which have been radiation sterilized, for example, and to heating of foods which have been dehydrated, cryogenically or otherwise.

Having fully disclosed and completely described my invention, and its mode of operation, what I claim as new is:

1. The method of microwave heating wherein the absorption of microwave heat by a food product is regulated comprising distributing a non-toxic and palatable ionizable salt non-uniformly throughout the food in such a pattern that the greater concentration of salt is in that portion of the food product which receives the least microwave energy, and applying microwave energy whereby a uniformly heated product is obtained.

2. The method of claim 1, in which the food is pre-cooked and the salt is distributed through the food during preparation thereof.

3. The method of claim 1, in which the food is pre-cooked and the salt is added thereto after preparation thereof.

4. The method of claim 1, in which the salt is a seasoning salt.

5. The method of claim 1, in which the salt is a preservative salt.

6. The method of claim 1, in which the salt is sodium chloride.

7. The method of microwave heating wherein the distribution of microwave heat in a combination of different individual foods having different rates of absorption of microwave energy is controlled comprising distributing a non-toxic and palatable ionizable salt through the different foods in relative concentrations which, as to the different foods, vary inversely with the rates of heat absorption of the different foods and which, in each individual food, provides a greater concentration of salt in that portion of the food product which receives the least microwave energy, and applying microwave energy whereby the combination of foods is uniformly heated.

8. The method of controlling the distribution of microwave heat in food which comprises partially dehydrating the food and mixing an organic liquid with said partially dehydrated food in substitution for at least a part of the extracted water, said organic liquid being non-toxic and palatable and having a specific heat capacity and latent heat fusion lower than that of water, and distributing a non-toxic and palatable ionizable salt through the food in a pattern of relative concentration generally corresponding to the desired pattern of heat concentration whereby upon application of microwave energy a substantially uniformly heated product is obtained.

9. The method of controlling the distribution of microwave heat in a food portion which comprises: (1) partially dehydrating the portion, (2) mixing an organic liquid, in substitution for at least a part of the extracted water, with said partially dehydrated food portion without heat application, said organic liquid having a specific heat capacity and latent heat of fusion lower than that of water and being non-toxic and free of undesirable taste, odor and appearance effects in the quantity utilized, and (3) applying microwave energy.

10. The method of claim 9, wherein the organic liquid is a fatty oil selected from the group consisting of corn oil, cottonseed oil, peanut oil, safflower oil and glycerol.

11. The method of claim 9, wherein the organic liquid is a polyunsaturated vegetable oil.

12. The method of claim 9, wherein the organic liquid is added to the food in the form of an emulsion.

13. The method of claim 9, wherein the organic liquid is water soluble.

14. The method of claim 9, wherein the organic liquid is added to the food in the form of a suspension.

References Cited by the Examiner

UNITED STATES PATENTS

| | | | |
| --- | --- | --- | --- |
| 2,485,659 | 10/1949 | Robertson | 99—214 |
| 2,973,268 | 2/1961 | Gooding et al. | 99—100 |
| 2,997,566 | 8/1961 | Pierce et al. | 219—10.55 |
| 3,109,739 | 11/1963 | Hilton | 99—100 |

OTHER REFERENCES

Copson et al.: Article in Journal of Agricultural and Food Chemistry, vol. 3, pages 423 to 427 (1955), TX341.J5.

Copson: Microwave Heating, pages 290–291, published 1962, by the Avi Publishing Co., TP4935.C67.

Talburt: Potato Processing (1959), Avi Publishing Co., page 243.

A. LOUIS MONACELL, *Primary Examiner.*

L. M. SHAPIRO, *Assistant Examiner.*